(12) United States Patent
Taki et al.

(10) Patent No.: US 8,508,821 B2
(45) Date of Patent: Aug. 13, 2013

(54) SHEET FEEDING APPARATUS, IMAGE FORMING APPARATUS AND SHEET FEEDING METHOD

(75) Inventors: Norikazu Taki, Kanagawa (JP); Hiroshi Takahashi, Kanagawa (JP); Kazushi Takei, Tokyo (JP); Hideaki Suzuki, Kanagawa (JP); Takeshi Iwasaki, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 377 days.

(21) Appl. No.: 12/923,213

(22) Filed: Sep. 9, 2010

(65) Prior Publication Data

US 2011/0063696 A1 Mar. 17, 2011

(30) Foreign Application Priority Data

Sep. 11, 2009 (JP) ................................. 2009-210639
Jul. 27, 2010 (JP) ................................. 2010-167785

(51) Int. Cl.
*H04N 1/04* (2006.01)
*H04N 1/46* (2006.01)
*G06F 3/12* (2006.01)
*B41J 29/38* (2006.01)
*B65H 5/00* (2006.01)
*B41L 13/00* (2006.01)
*H05B 6/14* (2006.01)

(52) U.S. Cl.
USPC .......... 358/498; 358/505; 358/1.15; 358/497; 358/488; 358/474; 358/486; 347/16; 271/10.01; 101/118; 219/619

(58) Field of Classification Search
USPC .......... 358/498, 505, 1.15, 497, 488; 347/16; 271/10.01; 101/118; 219/619
See application file for complete search history.

(56) References Cited

U.S. PATENT DOCUMENTS

| | | | |
|---|---|---|---|
| 8,223,408 B2 * | 7/2012 | Lee et al. | 358/488 |
| 2005/0184443 A1 * | 8/2005 | Satoh et al. | 271/10.01 |
| 2006/0086724 A1 * | 4/2006 | Yamamoto et al. | 219/619 |
| 2007/0002400 A1 * | 1/2007 | Kubota et al. | 358/497 |
| 2008/0148968 A1 * | 6/2008 | Takahashi | 101/118 |
| 2008/0212127 A1 * | 9/2008 | Takeyama | 358/1.15 |
| 2009/0073517 A1 * | 3/2009 | Kuroda | 358/505 |
| 2009/0284560 A1 * | 11/2009 | Takahashi | 347/16 |

FOREIGN PATENT DOCUMENTS

JP 2002-265094 A 9/2002

* cited by examiner

*Primary Examiner* — Charlotte M Baker
*Assistant Examiner* — Rury Grisham
(74) *Attorney, Agent, or Firm* — Harness, Dickey & Pierce, P.L.C.

(57) ABSTRACT

A sheet feeding apparatus is disclosed that includes a plurality of size sensors configured to be arranged in line and to detect a sheet set into a predetermined position; a feeding part configured to feed the sheet set into the predetermined position to a scan position; and a controller configured to control the feeding part to feed the sheet based on two detect signals output from two size sensors among the plurality of the size sensors.

18 Claims, 17 Drawing Sheets

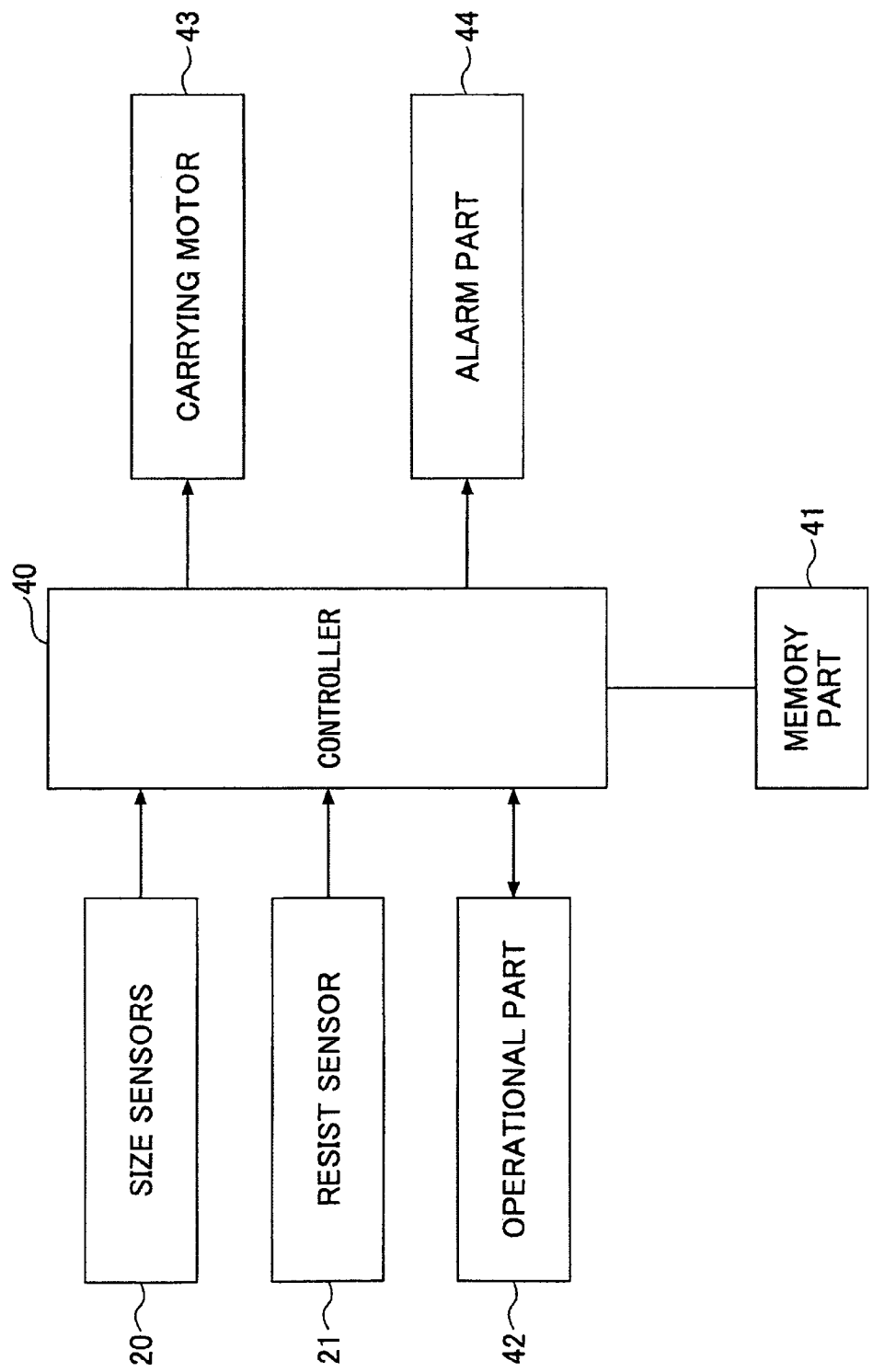

FIG.4

| SIZE SENSOR | DISTANCE FROM T | SIZE OF SHEET |
|---|---|---|
| S1 | 105mm | A4 |
| S2 | 91mm | A4 |
| S3 | 137mm | A3 |
| S4 | 115mm | B4 |
| S5 | 195mm | A2 |
| S6 | 163mm | B3 |
| S7 | 282mm | A1 |
| S8 | 235mm | B2 |
| S9 | 400mm | A0 |
| S10 | 335mm | B1 |
| S11 | 451mm | Z |

FIG.9

| SENSOR A | SENSOR B | SENSOR C |
|---|---|---|
| S1 | S2 | S4 |
| S2 | S1 | NONE |
| S3 | S4 | S6 |
| S4 | S1 | S3 |
| S5 | S6 | S8 |
| S6 | S3 | S5 |
| S7 | S8 | S10 |
| S8 | S5 | S7 |
| S9 | S10 | NONE |
| S10 | S7 | S9/S11 |
| S11 | S10 | NONE |

| DECIMAL DIGIT VALUE | SENSOR A |
|---|---|
| 1 | S1 |
| ⋮ | ⋮ |
| 7 | S5 |
| ⋮ | ⋮ |

SHEET FEEDING APPARATUS, IMAGE FORMING APPARATUS AND SHEET FEEDING METHOD

BACKGROUND OF THE INVENTION

1. Field of the Invention

The present invention generally relates to a sheet feeding apparatus, an image forming apparatus and a sheet feeding method.

2. Description of the Related Art

A sheet feeding apparatus included in a copy machine, a scanner or the like is required to feed various sizes of sheets. For example, a sheet feeding apparatus is required to feed a sheet of 914 mm long at the maximum in the shorter side of the sheet. A user of the sheet feeding apparatus sets the sheet into the precise position relative to feeding rollers by striking the edge of the sheet to the feeding rollers, and then the sheet feeding apparatus feeds the sheet which is held between the feeding rollers by rotating the feeding rollers in a predetermined rotational direction.

However, there is a possibility that a document printed on the sheet is not scanned precisely, or the document is not copied precisely, particularly in a case where the sheet is relatively wide and the user is not accustomed to set the wide sheet into the precise position.

Therefore, for example, Japanese Patent Laid-Open Publication No. 2002-265094 (hereinafter referred to as patent document 1) discloses a sheet feeding apparatus that sets a preparation time in which a user can set sheet into a precise position even if the user is not accustomed to handle a wide sheet. The sheet feeding apparatus disclosed in patent document 1 begins to feed the sheet after informing the end of the preparation time to the user with blink of an LED or alarm.

It becomes possible to set the sheet into the precise position even if the user is not accustomed to handle the sheet by setting the preparation time before feeding the sheet.

However, according to the sheet feeding apparatus disclosed in patent document 1, it is necessary to wait for the preparation time to pass even when the user could set the sheet into the precise position immediately. Further, it is necessary to wait for the preparation time to pass every time the user sets the sheet, even when the user becomes accustom to setting a large size sheet into the precise position.

Therefore, according to the sheet feeding apparatus disclosed in patent document 1, working efficiency of the user may be lowered because of the preparation time. Moreover, the user may not be able to set the sheet into the precise position in the preparation time.

SUMMARY OF THE INVENTION

It is a general object of the present invention to provide a sheet feeding apparatus, an image forming apparatus and a sheet feeding method that can enable the user to set the sheet into the precise position and can improve working efficiency of the user.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a sheet feeding apparatus, an image forming apparatus and a sheet feeding method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a sheet feeding apparatus including: a plurality of size sensors configured to be arranged in line and to detect a sheet set into a predetermined position; a feeding part configured to feed the sheet set into the predetermined position to a scan position; and a controller configured to control the feeding part to feed the sheet based on two detect signals output from two size sensors among the plurality of the size sensors.

Another embodiment of the present invention provides a sheet feeding method, wherein the sheet feeding apparatus comprises a plurality of size sensors arranged in line and configured to detect a sheet set into a predetermined position; and a feeding part configured to feed the sheet set into the predetermined position to a scan position, the method including: detecting the sheet set into the predetermined position based on a detect signal output from the plurality of size sensors; and controlling the feeding part to feed the sheet based on two detect signals output from two size sensors among the plurality of the size sensors.

Other objects and further features of the present invention will be apparent from the following detailed description when read in conjunction with the accompanying drawings.

BRIEF DESCRIPTION OF THE DRAWINGS

FIG. 2 is a schematic drawing showing a hardware block diagram of a sheet feeding part 2;

FIG. 4 shows a table which represents relationships among the size sensors, distances between locations of the size sensors and the midpoint T, and sizes of the sheets detected by the size sensors;

FIG. 9 shows a table which represents relationships between the sensor A, the sensor B and a sensor C;

DESCRIPTION OF THE PREFERRED EMBODIMENTS

In the following, embodiments of the present invention will be described with reference to the accompanying drawings.

Figure 1:
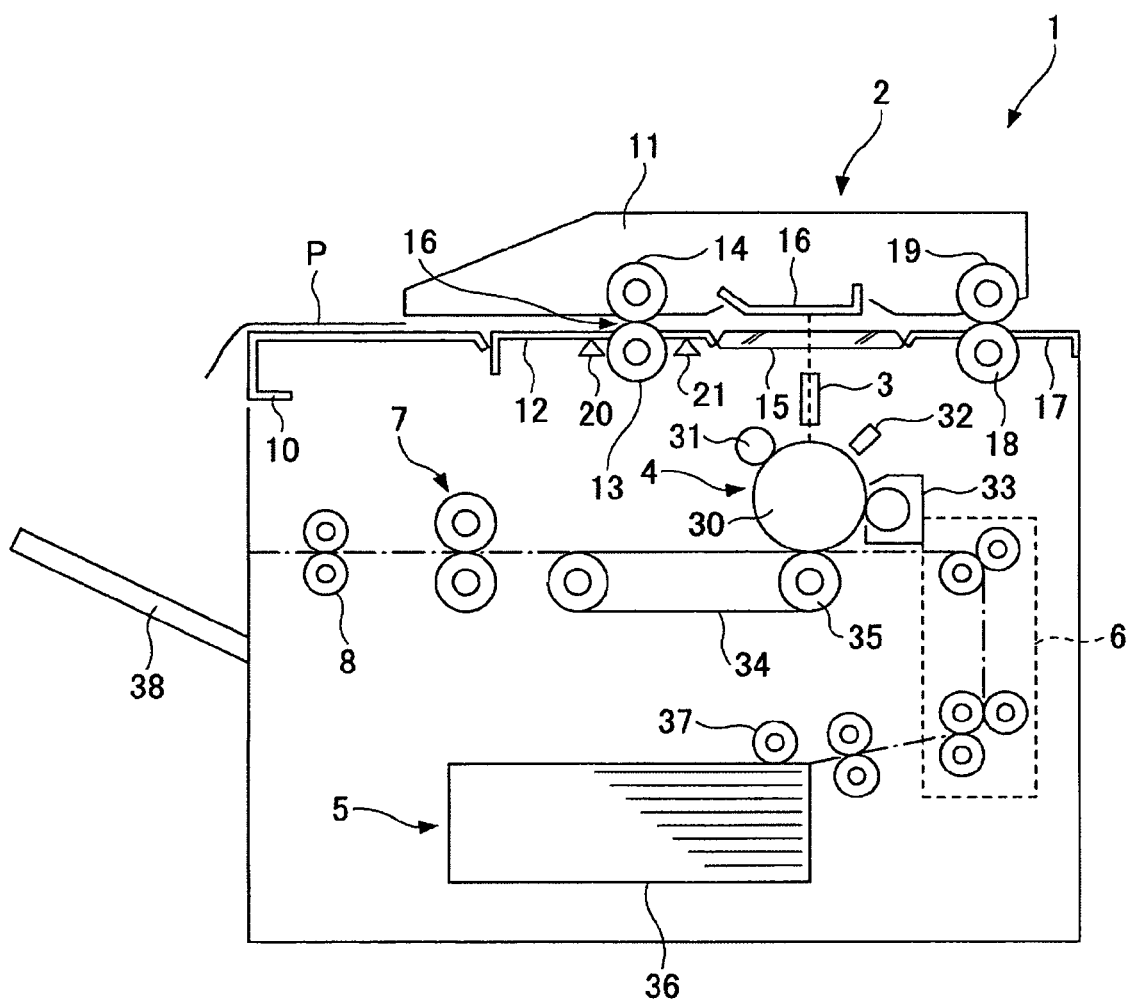
FIG. 1 is a schematic drawing showing side view of an image forming apparatus 1 according to one embodiment.

FIG. 1 is a schematic drawing showing the side view of an image forming apparatus 1 according to one embodiment.

The image forming apparatus 1 of the present embodiment includes a sheet feeding part 2, a scanning part 3, an image forming part 4, a feeding part 5, a sheet carrying part 6, a fixing part 7 and an ejecting part 8. The sheet feeding part 2 constitutes a sheet feeding apparatus.

The sheet feeding part 2 includes a loading part 10, an upper guide unit 11, a lower guide plate 12, a feeding roller 13, a pressing roller 14, a contact glass 15, a white board 16, a guide plate 17, an ejecting roller 18 and a pressing roller 19.

The loading part 10 is a part of the feeding part on which a sheet P is to be mounted. The upper guide unit 11 and the lower guide plate 12 guides the sheet P mounted on the loading part 10 between the feeding roller 13 and the pressing roller 14. The feeding roller 13 and the pressing roller 14 feeds the sheet P between the contact glass 15 and the white board 16. The contact glass 15 and the white board 16 are disposed to face each other and are disposed on the scanning part 3. The guide plate 17 guides the sheet P which is scanned by the scanning part 3. The ejecting roller 18 and the pressing roller 19 ejects the sheet P scanned by the scanning part 3.

The upper guide unit 11 includes a operating part which includes a display, and an alarm device such as LEDs, a buzzer or the like.

The sheet P is manually set on the loading part 10, by the user, so that a surface of the sheet P to be scanned faces downward. The user inserts the sheet P between the upper guide unit 11 and the lower guide plate 12 until the fore end of the sheet P confronts a nip portion between the feeding roller 13 and the pressing roller 14. When the feeding roller 13 begins to rotate, the sheet P is being fed onto the contact glass 15 and scanned by the scanning part 3. The sheet P is fed along the guide plate 17 and ejected by the ejecting roller 18 and the pressing roller 19.

A plurality of size sensors 20 are disposed upstream of the feeding roller 13. The size sensors 20 detect size of the sheet P. For example, a plurality of optical sensors each of which includes a light emitting element and a light sensitive element may be used as the sensors 20. The optical sensors are disposed under the lower guide plate 12 and aligned in the direction of an axis of the feeding roller 13, i.e. in the direction of the sheet P. The light emitting element and the light sensitive element of each of the optical sensors are disposed under through hole of the lower guide plate 12. The light sensitive element receives light emitted from the light emitting element through the through hole. The size of the sheet P can be detected by one of the optical sensors. The size sensors 20 are not limited to the optical sensors described above. Electrical sensors or mechanical sensors besides the optical sensors may be used as the size sensors 20.

A resist sensor 21 is disposed between the feeding roller 13 and the contact glass 15. When the resist sensor 21 detects the fore end of the sheet P fed by the feeding roller 13, the image forming apparatus 1 suspends feeding process of the sheet P temporarily, and then resumes the feeding process at a predetermined velocity in order to scan data of the sheet P.

The scanning part 3 includes a known image scanning sensor such as CIS or the like. The scanning part 3 scans the data of the sheet P which passes over the contact glass 15, and transmits an image data obtained by scanning the sheet P to the image forming part 4.

The image forming part 4 includes a photoconductive drum 30, a charged roller 31, an exposure unit 32, a developing roller 33, a feeding belt 34 and a transfer roller 35. The image forming part 4 is a known image forming part. The image forming part 4 rotates and charges the surface of the photoconductive drum 30 by utilizing the charged roller 31. Then the image forming part 4 exposes the surface of the photoconductive drum 30 by utilizing the exposure unit 32 based on the image data obtained by the scanning part 3, and changes surface potential of the photoconductive drum 30 in order to form an electrostatic latent image on the surface of the photoconductive drum 30. Toner contained in the developing roller 33 transfers onto the electrostatic latent image, and then a toner image is formed on the photoconductive drum 30. The toner image is transferred on to a print sheet which passes between the photoconductive drum 30 and the transfer roller 35, and the print sheet is fed by the feeding belt 34. The developing process described above is known art.

The feeding part 5 feeds the print sheets disposed in a sheet cassette 36 one by one to the sheet carrying part 6. The sheet carrying part 6 carries the print sheet by utilizing the plural pair of carrying rollers disposed along a sheet carrying path.

The fixing part 7 carries the print sheet on which the toner image is transferred, and fixes the toner image on the print sheet. Then the print sheet is ejected into a receiving tray 38 by the ejecting part 8.

FIG. 2 is a schematic drawing showing a hardware block diagram of the sheet feeding part 2.

A controller 40 controls a carrying motor 43 based on a detect signal received from the size sensors 20 and the resist sensor 21, and an operational signal received from a operational part 42 which includes a display. The carrying motor 43 rotates the feeding roller 13 and the ejecting roller 18. The controller 40 controls feeding process of the sheet by controlling the carrying motor 43. A memory part 41 stores data, which is necessary for executing the feeding process, such as data representing relationship between the size of the sheet and detect signal of the size sensor 20 and data representing that the sheet is set into the precise position.

An alarm 44 informs the user whether the sheet is set into the precise position relative to the feeding roller 13 and the pressing roller 14 or not by utilizing the LEDs or the buzzer. The control part 40 determines whether the sheet is set into the precise position or not, controls the alarm 44 in order to inform the user of the result of the determination, and causes the operational part 42 to display a message regarding position of the sheet. The operational part 42 and the alarm 44 constitute an alarm part.

Figure 3A:
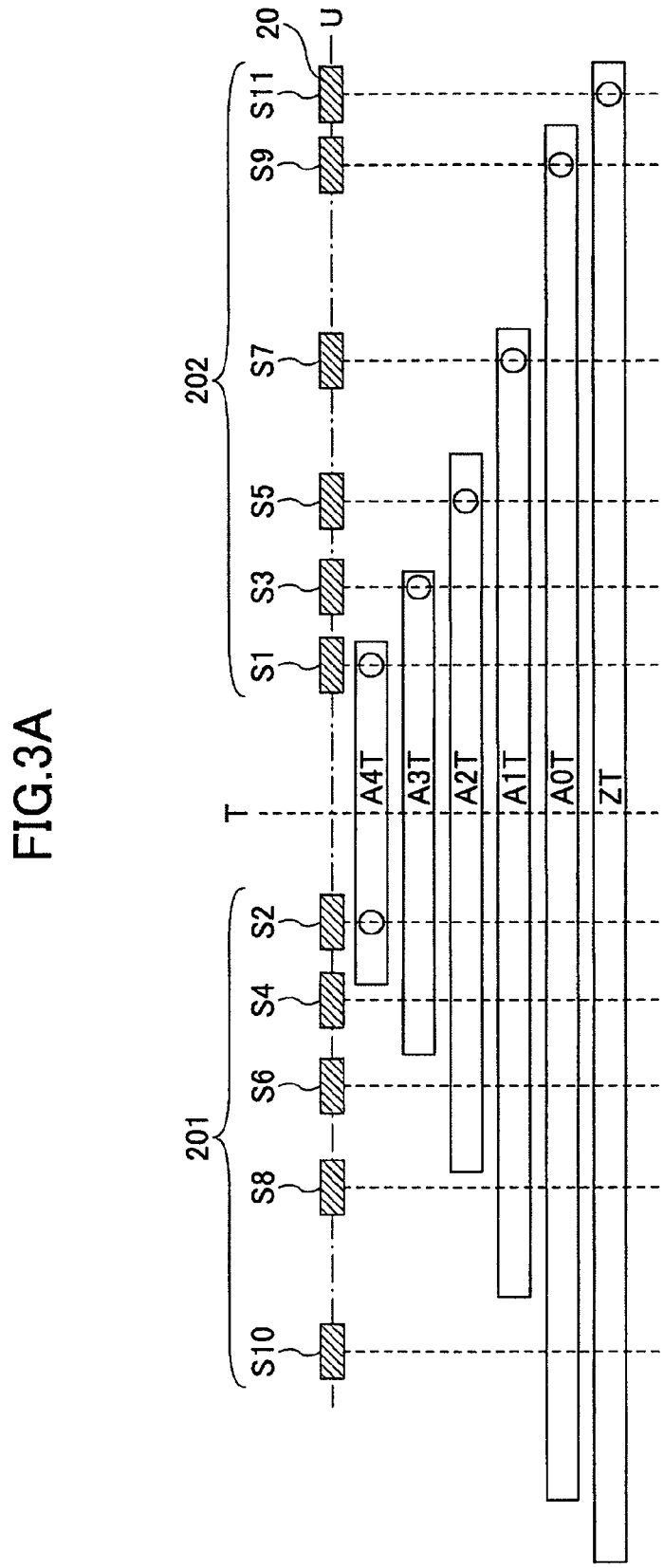
FIGS. 3A and 3B are schematic drawings showing locational relationships between eleven size sensors S1 to S11 and fore ends of various sizes of sheets.
Figure 3B:
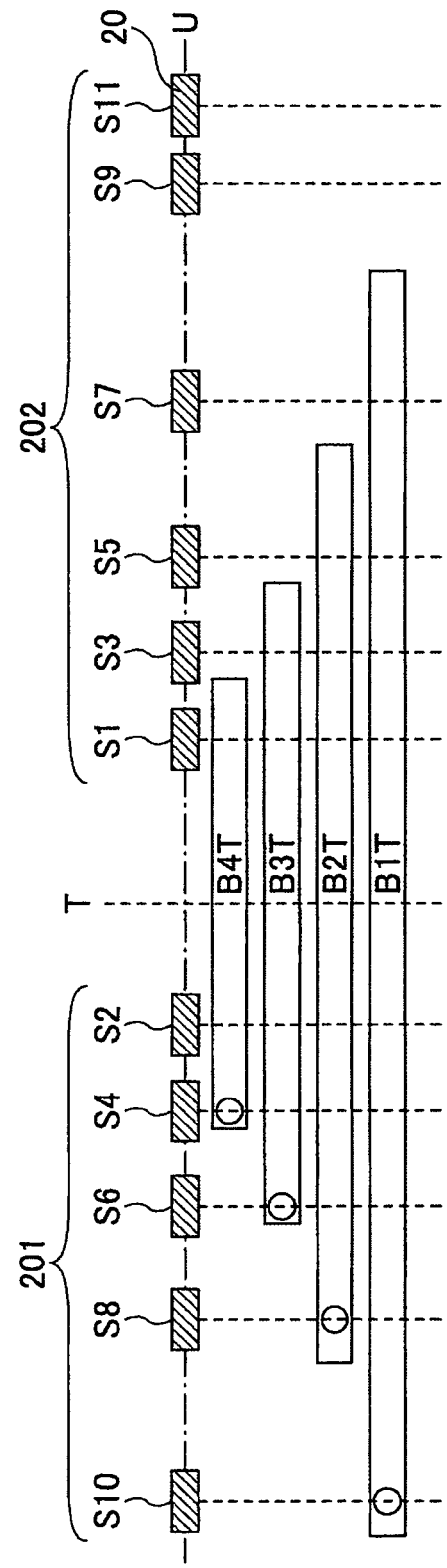

FIGS. 3A and 3B are schematic drawings showing positional relationships between eleven size sensors S1 to S11 and fore ends of various sizes of the sheets.

The size sensors S1, S3, S5, S7, S9 and S11 are disposed on the right side of a midpoint T, and the size sensors S2, S4, S6, S8 and S10 are disposed on the left side of the midpoint T. Herein, the midpoint T corresponds to a midpoint of the width of the sheet to be set into the precise position relative to the feeding roller 13 and the pressing roller 14.

The size sensors S1 to S11 are disposed along the central axis U of the feeding roller 13. Each of the size sensors S1 to S11 is disposed in a position corresponding to an edge portion in the direction of the width of a predetermined size of the sheet. When the sheet is set into the precise position, the detect signal of the outermost size sensor among the size sensor(s) which detects the sheet represents the size of the sheet.

Herein, the size sensors S1 to S11 are divided into two groups, i.e. the left side sensors 201 and the right side sensors 202. The left side sensors 201 are arranged in the left side with regard to the midpoint T. The right side sensors 202 are arranged in the right side with regard to the midpoint T.

As shown in FIGS. 3A and 3B, the left side sensors 201 includes the size sensors S2, S4, S6, S8 and S10, and the right side sensors 202 includes the size sensors S1, S3, S5, S7, S9 and S11.

The left side sensors 201 and the right side sensors 202 may be formed to output the detect signal independently. Alternatively, the left side sensors 201 and the right side sensors 202 may be formed to output the detect signal jointly, i.e. the left side sensors 201 and the right side sensors 202, as the eleven size sensors 20, may output eleven detect signals.

Hereinafter, for example, in a case where the size sensors S2, S4, S6, S8 and S10 included in the left side sensors 201 output the detect signals of "1" "1" "1" "0" "0", five detect signals are represented as {0, 0, 1, 1, 1}. Arrangement of the five detect signals {0, 0, 1, 1, 1} corresponds to the arrangement of the size sensors S10, S8, S6, S4 and S2 as shown in FIGS. 3A and 3B. Order of the five detect signals represents locational order of the five size sensors S10, S8, S6, S4 and S2, in the order of farthest from the midpoint T to closest to the midpoint T.

Similarly, in a case where the size sensors S1, S3, S5, S7, S9 and S11 included in the right side sensors 202 output the detect signals of "1" "1" "1" "1" "0" "0" six detect signals are represented as {0, 0, 1, 1, 1, 1}. Order of the six detect signals represents locational order of the six size sensors S11, S9, S7, S5, S3 and S1, in the order of farthest from the midpoint T to closest to the midpoint T.

Herein, each of the size sensors S1 to S11 outputs the detect signal "1", when each of the size sensors S1 to S11 detects the sheet. On the contrary, each of the size sensors S1 to S11 outputs the detect signal "0", when each of the size sensors S1 to S11 does not detect the sheet. Signal level of the detect signal is not limited as described above, i.e. the signal level of the size sensors may be inverted.

According to the present exemplary embodiment, the size sensors S1 to S11 are arranged so that the sizes of the sheets of A sizes (A0, A1, A2, A3, A4), B sizes (B1, B2, B3, B4) and Z size (914 mm in width) can be detected. Herein, A4T, A3T, A2T, A1T, A0T, ZT, B4T, B3T, B2T and B1T, shown in FIGS. 3A and 3B, represent width of the A4, A3, A2, A1, A0, Z, B4, B3, B2 and B1 size sheets respectively. The width of the sheet represents length of the shorter side of each size of the sheets.

The right side sensors 202 detect the A-size sheets and the Z-size sheet as shown in FIG. 3A, and the left side sensors 201, except for the size sensor S2, detect the B-size sheets as shown in FIG. 3B. Each circle, as shown in FIGS. 3A and 3B, represents the size of the sheet detected by each of the size sensors S1 to S11. In this exemplary embodiment, the size sensors S1 and S2 are used for detecting the A4 size. The size sensor S2 may be used for detecting a certain B-size sheet, such as B5 size, which is smaller than A4 size.

FIG. 4 shows a table which represents relationships among the size sensors, distances between locations of the size sensors and the midpoint T, and sizes of the sheets detected by the size sensors.

Although the distance between the size sensor S2 and the midpoint T is 91 mm, which corresponds to the width of the B5-size sheet, the size sensor S2 is used for detecting A4-size sheet as described above, in the present embodiment.

Figures 10, 11:
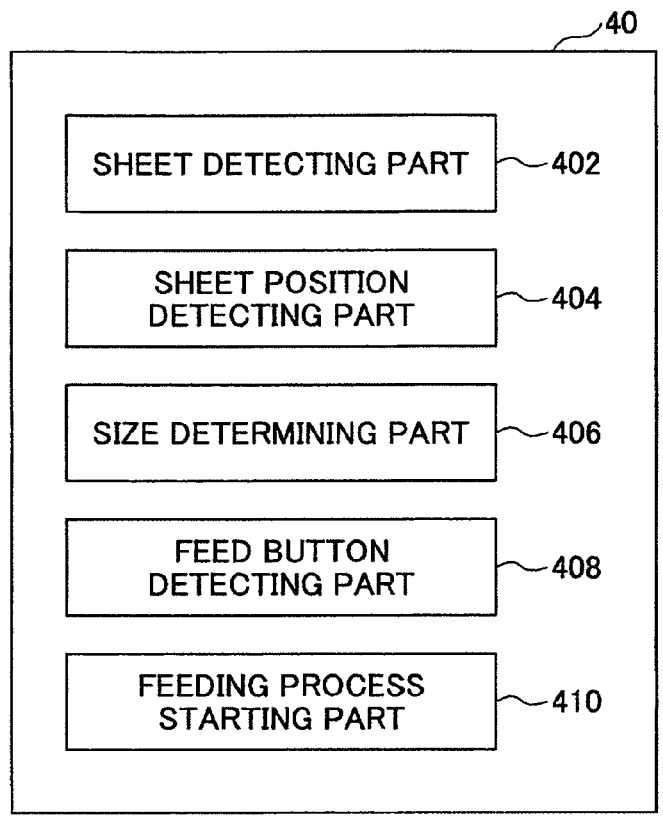
FIG. 10 is a schematic drawing showing a controller 40 of the image forming apparatus 1.
FIG. 11 is a schematic drawing showing a table which represents relationship among the size sensors and a decimal digit value.

Hereinafter, processes performed by the feeding part 2 will be described with reference to FIGS. 5 to 10. FIG. 10 is a schematic drawing showing the controller 40 of the image forming apparatus 1.

As shown in FIG. 10, the controller 40 includes a sheet detecting part 402, a sheet position detecting part 404, a size determining part 406, a feed button detecting part 408 and a feeding process starting part 410.

Figure 5:
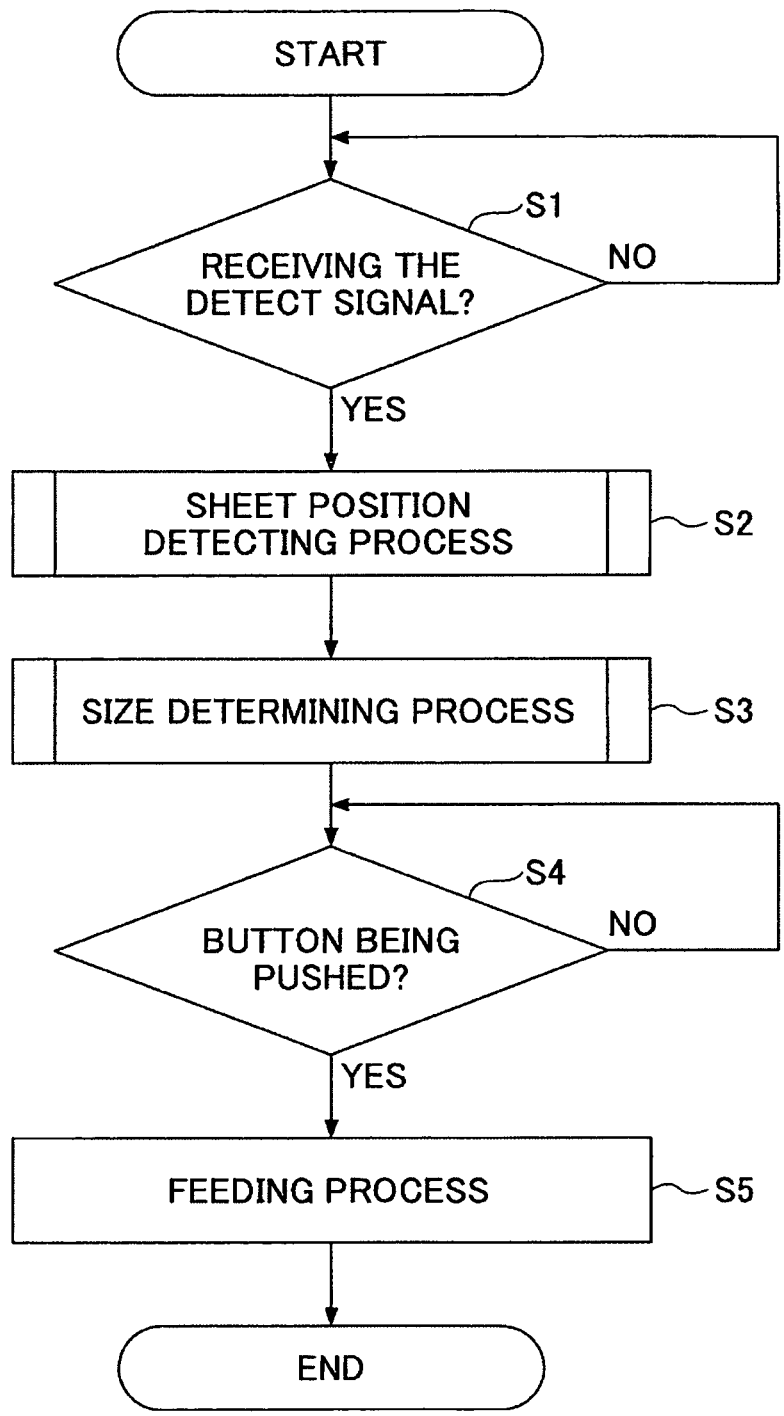
FIG. 5 shows a flowchart of overall processes of the feeding part 2 of the present embodiment.

The flowchart, as shown in FIG. 5, shows overall processes of the feeding part 2 of the present embodiment. The sheet detecting part 402 determines whether the sheet detecting part 402 receives the detect signal from the left side sensors 201 or the right side sensors 202 (step S1). The left side sensors 201, or the right side sensors output the detect signal(s) when the sheet confronts the nip portion between the feeding roller 13 and the pressing roller 14.

If the sheet detecting part 402 receives the detect signal(s) (S1 YES), the sheet position detecting part 404 executes a sheet position detecting process (step S2). The sheet position detecting process in step S2 will be described in detail later with reference to FIG. 6.

When the sheet position detecting part 404 finishes the sheet position detecting process, the size determining part 406 executes a size determining process (step S3). The size determining process in step S3 will be described in detail later with reference to FIG. 7.

When the size determining part 406 finishes the size determining process, the feed button detecting part 408 determines whether a feed button of operational part 42 is pushed or not (step S4). If the feed button detecting part 408 determines that the button is pushed (S4 YES), the feeding process starting part 410 starts feeding process (step S5). In the feeding process, the feeding process starting part 410 drives the carrying motor 43.

Figure 6:
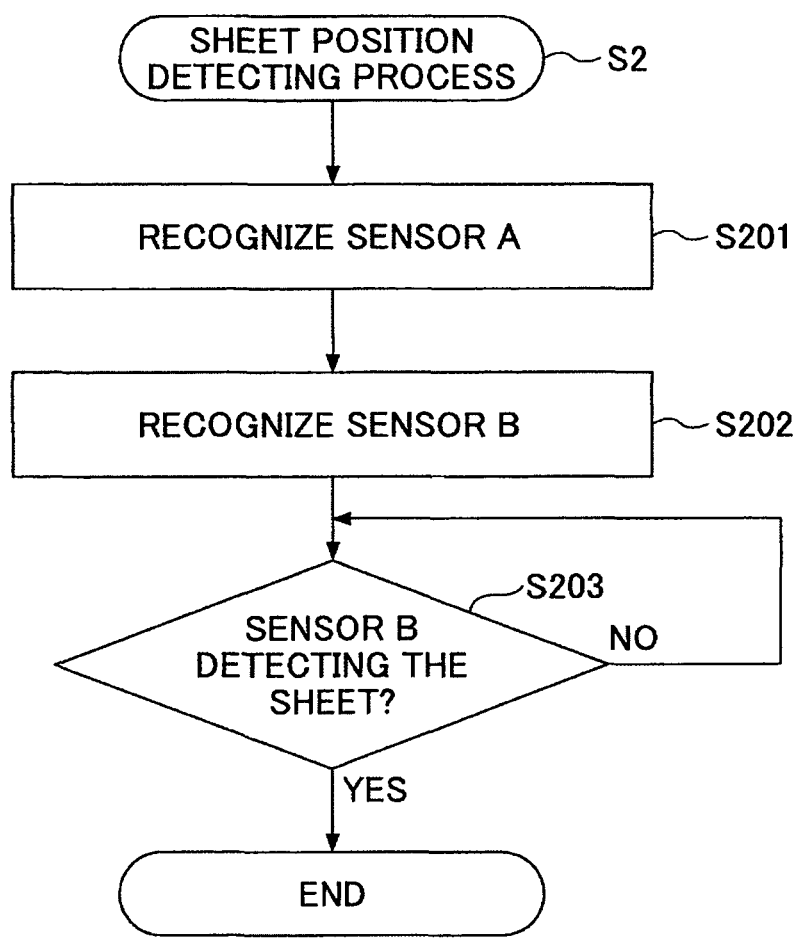
FIG. 6 shows a flowchart of a sheet position detecting process.

Hereinafter, the sheet position detecting process, shown in FIG. 6, will be described in detail. In the sheet position detecting process, the sheet position detecting part 404 determines whether the sheet is set into the precise position or not. FIG. 6 shows the flowchart of the sheet position detecting process which is executed by the sheet position detecting part 404. The flowchart shown in FIG. 6 corresponds to step S2 shown in FIG. 5.

In the sheet position detecting process, the sheet position detecting part 404 recognizes which size sensor(s), among the size sensors S1 to S11, detects the sheet, and then determines the outermost size sensor among the size sensor(s) which detects the sheet (step S201). The sheet position detecting part 404 recognizes the outermost size sensor as sensor A. In other words, the size sensor, among the size sensor(s) detecting the sheet, which is located farthest away from the midpoint T becomes the sensor A.

Hereinafter, two methods for determining the sensor A will be described.

Herein, the size sensor 20 outputs the detect signal "1" when the size sensor 20 detects the sheet. The size sensor 20 outputs the detect signal "0" when the size sensor 20 does not detect the sheet.

According to the first method, the sheet position detecting part 404 recognizes each of the detect signals output from the size sensors, and determines the sensor A by selecting the outermost size sensor among the size sensor(s) which outputs the detect signal "1".

Next, the second method will be described below. For example, in a case where the size sensor S1 detects the sheet, the sheet position detecting part 404 converts the detect signals of the right side sensors 202 which include the size sensor S1 to decimal digit. According to the second method, the sheet position detecting part 404 utilizes a table data shown in FIG. 11.

FIG. 11 is a schematic drawing showing a table which represents relationship among the size sensors and the decimal digit value. The table data which represents the table shown in FIG. 11 is stored in the memory part 41 in advance. According to the table shown in FIG. 11, in a case where the decimal digit value is "1", the sensor A corresponds to the size sensor S1, and in a case where the decimal digit value is "7", the sensor A corresponds to the size sensor S5.

For example, in a case where the detect signals of the size sensors S11, S9, S7, S5, S3, S1 included in the right side sensors 202 are represented as {0, 0, 0, 1, 1, 1}, the sheet position detecting part 404 converts {0, 0, 0, 1, 1, 1} to decimal digit value "7". Then the sheet position detecting part 404 recognizes the size sensor S5 as the sensor A based on the decimal digit value "7" and the table shown in FIG. 11.

Herein, method for determining the sensor A is not limited to the first method and the second method.

Figure 8:
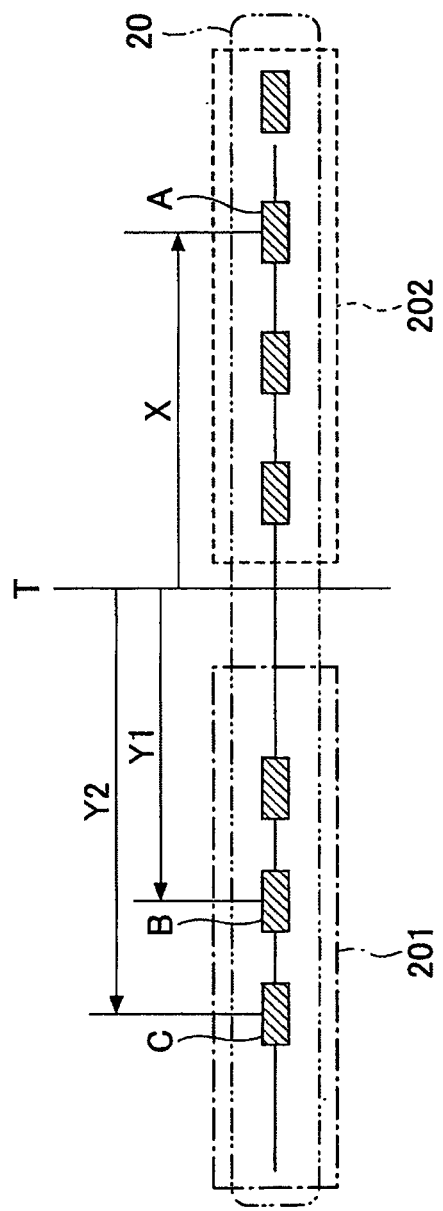
FIG. 8 is a schematic drawing showing locational relationship between a sensor A and a sensor B.

As shown in FIG. 6, after recognizing the sensor A, the sheet position detecting part 404 recognizes sensor B based on the sensor A (step S202). FIG. 8 is a schematic drawing showing positional relationship between the sensor A, the sensor B and a sensor C. In FIG. 8, dashed line surrounds the right side sensors 202, alternate long and short dash line surrounds the left side sensors 201, and alternate long and two short dashes line surrounds the size sensors 20.

As shown in FIG. 8, the sensor B is disposed in the opposite side of the sensor A with respect to the midpoint T. Herein, distance between the midpoint T and the sensor A is referred to as X. The sheet position detecting part 404 recognizes one of the size sensors included in the left side sensors 201 as the sensor B based on distance Y1 between the size sensor and the midpoint T. The sheet position detecting part 404 recognizes the size sensor which has the closest distance Y1 to the distance X, as the sensor B. In other words, the size sensor, among the size sensor(s) having the distance Y1 less than the distance X, which is located farthest away from the midpoint T becomes the sensor B. The sensor B is located in the opposite side of the sensor A with respect to the midpoint T and located second outermost from the midpoint among the size sensors detecting the sheet.

Alternatively, the sheet position detecting part 404 may utilizes table shown in FIG. 9 when the sheet position detecting part 404 recognizes the sensor B. The sheet position detecting part 404 may produce the table shown in FIG. 9 based on relationship between the distance X and the distance Y. The table data which represents the table shown in FIG. 9 is stored in the memory part 41 in advance. After recognizing the sensor A, the sheet position detecting part 404 recognizes the sensor B based on the table shown in FIG. 9. For example, in a case where the sheet position detecting part 404 recognizes the size sensor S5 as the sensor A, the size sensor S6 becomes the sensor B.

Next, as shown in FIG. 6, the sheet position detecting part 404 determines whether the sensor B detects the sheet or not (step S203). If the sensor B detects the sheet (S203 YES), the sheet position detecting part 404 determines that the sheet is set into the precise position. If the sensor B does not detect the sheet (S203 NO), the sheet position detecting part 404 executes the process of step S203 repeatedly, because the sheet is not set into the precise position. The image forming apparatus 1 executes alarm process and message display process until the sensor B detects the sheet, i.e. until the sheet is set into the precise position. The sheet position detecting part 404 finishes the sheet position detecting process when the sheet is set into the precise position.

Herein, the sensor A constitutes a first size sensor, the sensor B constitutes a second size sensor and the sensor C constitutes a third size sensor.

Figure 7:
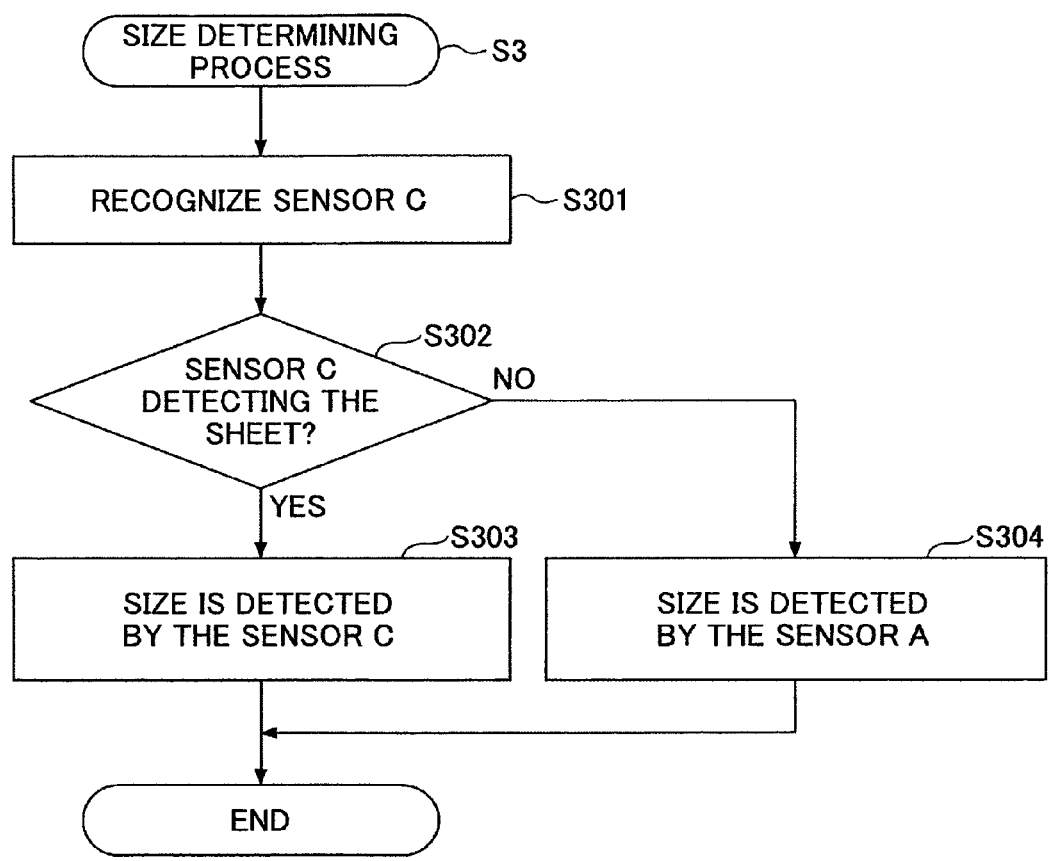
FIG. 7 shows a flowchart of a size determining process which is executed by a size determining part 406.

Hereinafter, the size determining process, shown in FIG. 6, will be described in detail. In the size determining process, the size determining part 406 determines the size of the sheet. FIG. 7 shows the flowchart of the size determining process which is executed by the size determining part 406. The flowchart shown in FIG. 7 corresponds to step S3 shown in FIG. 5. Herein, for example, the size determining process which determines the size of the sheet by utilizing information of the sensor A will be described.

The size determining part 406 determines a sensor C (step S301). As shown in FIG. 8, the sensor C is disposed in the opposite side of the sensor A with respect to the midpoint T, i.e. the sensor C is disposed in the same side as the sensor B. Herein, distance between the midpoint T and the sensor A is referred to as X.

The size determining part 406 recognizes one of the size sensors included in the left side sensors 201 as the sensor C based on distance Y2 between the size sensor and the midpoint T. The size determining part 406 recognizes the size sensor which has longer distance Y2 than the distance X and has possibility of detecting the sheet, as the sensor C. In other words, the size sensor, which is located farther away from the midpoint T than the sensor B and is located next to the sensor B, becomes the sensor C. The sensor C is located on the same side as the sensor B with respect to the midpoint T and located outside next to the sensor B.

The size determining part 406 determines the sensor C based on the sensor A by utilizing the table shown in FIG. 9. For example, in a case where the size sensor S3 is recognized as the sensor. A, the size determining part 406 determines the size sensor S6 as the sensor C. The table data which represents the table shown in FIG. 9 is stored in the memory part 41 in advance.

The size determining part 406 determines whether the sensor C detects the sheet or not based on the detect signal of the sensor C (step S302). Potential size of the sheet may be the size detected by sensor A and the next size which is larger than the size detected by sensor A, when the sheet position detecting part 404 recognizes the sensor A.

Figure 12:
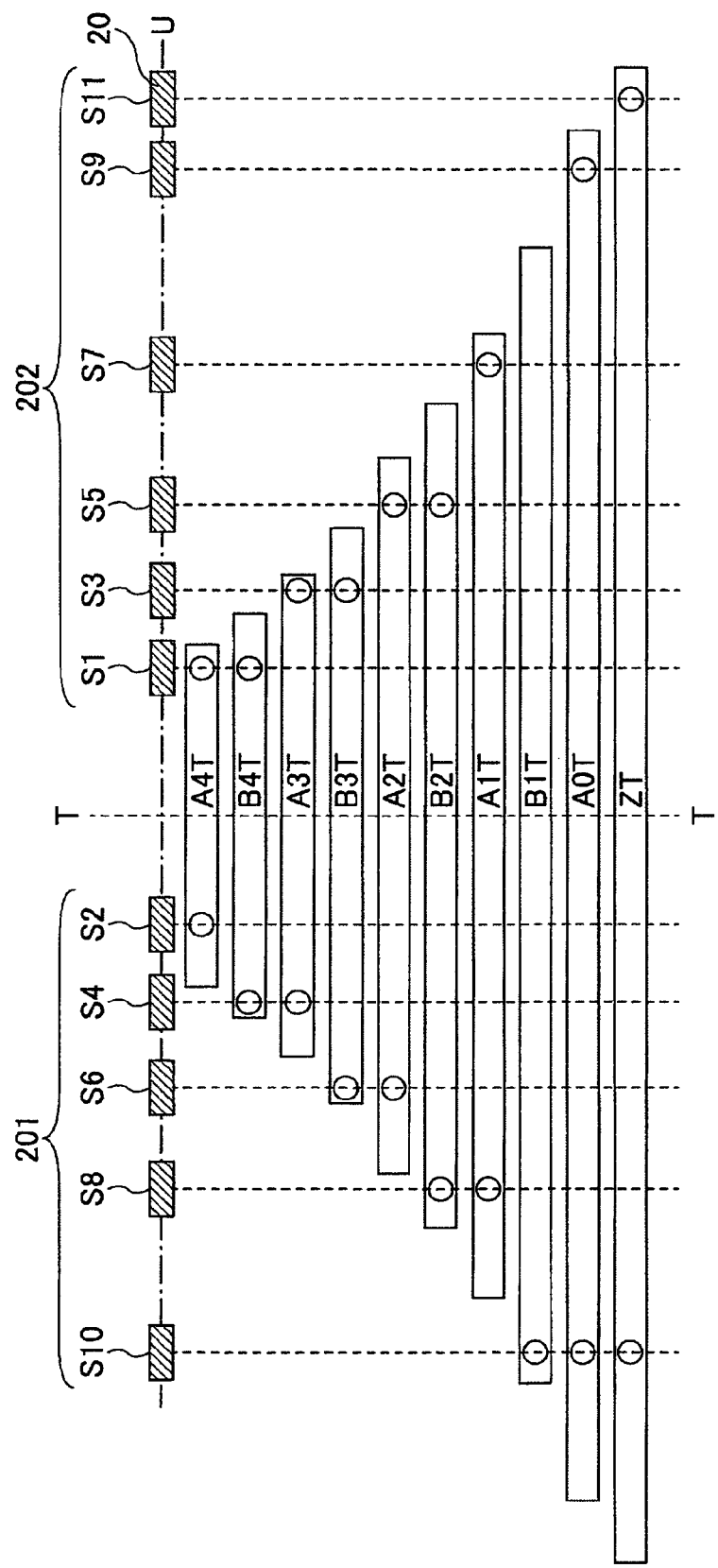
FIG. 12 shows positional relationship between the fore ends of various sizes of the sheets and the corresponding size sensors when each size of the sheet is set into a precise position.

FIG. 12 shows positional relationship between the fore ends of various sizes of the sheets and the corresponding size sensors when each size of the sheet is set into the precise position. For example, in a case where the size of the sheet is A3, the size sensors S3 and S4 detect the edge of the sheet. The edges of the sheets are indicated by circles as shown in FIG. 12. For example, in a case where the size sensor S5 is recognized as the sensor A, the size determining part 406 recognizes that the size sensor S5 is the outermost size sensor among the size sensors which detect the sheet among the right side sensors 202 when the size determining part 406 detects the sensor A. In this case, the size sensor C is recognized as the sensor C.

The size determining part 406 determines that the potential sizes are A2 and B2, because the two circles corresponding to the size sensor S5 are included in A2T and B2T as shown in FIG. 12. As shown in FIG. 4, the size sensor S5 corresponds to A2 size, and the size sensor S8 corresponds to B2 size. The distance between the size sensor S8 and the midpoint T is 235 mm, and is longer than the distance between the sensor S5 and the midpoint T (195 mm).

Then the size determining part 406 determines correct size of the sheet among the two potential sizes by utilizing the detect signal of the sensor C. In the process of the step S302, the size determining part 406 determines whether the size of the sheet is detected by the sensor A or the sensor C. More specifically, if the sensor C detects the sheet, the size determining part 406 determines that the size of the sheet is the size corresponding to the sensor C. On the contrary, if the sensor C does not detect the sheet, the size determining part 406 determines that the size of the sheet is the size corresponding to the sensor A. Since the sensor C outputs the detect signal "1" when the sensor C detects the sheet, and the sensor C outputs the detect signal "0" when the sensor C does not detect the sheet, the size determining part 406 determines whether the sensor C detects the sheet or not based on the detect signal of the sensor C.

Herein, there are some cases where the sensor C does not exist. For example, in a case where the size sensor S9 or S11 is recognized as the sensor A, there is no size sensor which is recognized as the sensor C. In those cases, the size determining part 406 determines that the sensor C does not detect the sheet at step S302.

After determining that the sensor C detects the sheet (S302 YES), the size determining part 406 proceeds to step S303. In this case, the size determining part 406 determines that the size of the sheet is bigger size among the potential sizes, i.e. size B2 which is detected by the sensor C (step S303).

On the contrary, after determining that the sensor C does not detect the sheet (S302 NO), the size determining part 406 proceeds to step S304. In this case, the size determining part 406 determines that the size of the sheet is smaller size of the potential sizes, i.e. size A2. Size A2 corresponds to the sensor A.

As shown in FIG. 9, the sensor A and the sensor C have one-on-one relationship except for the size sensor S10. If the sensor C detects the sheet, the size of the sheet is determined as the size corresponding to the sensor C.

Herein, there are some exceptional cases where a plurality of the sensor C corresponds to the sensor A, because of relationship of distances between the size sensors included in the right side sensors 202 and distances between the size sensors included in the left side sensors 201. For example, in a case where the size sensor S10 is recognized as the sensor A, the size sensors S9 and S11 are recognized as the sensor C. In this case, the size determining part 406 determines whether the size sensor S11 (sensor C) detects the sheet or not based on the detect signal of the size sensor S11 (sensor C) at step S302. That is to say, the size determining part 406 determines the size of the sheet based on the sensor C which detects the largest size among plurality of the sensors C. For example, in a case where the size sensors S9 and S11 are recognized as the sensor C, the size determining part 406 determines the size of the sheet based on the size sensor S11. In this case, at step S303, the size determining part 406 determines that the size of the sheet is Z, since the size sensors S9 and S11 detect size A0 and size Z respectively.

Herein, there are many kinds of methods for determining the size of the sheet. Thus, the size determining process is not limited to the process as described above. For example, the controller 40 may detect all of the detect signals output from all of the sensors S1 to S11, and determine the size of the sheet based on the detect signal which represents the largest size among the detect signals indicating detection of the sheet.

As described above, when the size sensor(s) 20 detects the sheet, the sheet position detecting part 404 recognizes the outermost size sensor 20 among the size sensor(s) 20 that detects the size of the sheet as sensor A. Then the sheet position detecting part 404 recognizes sensor B based on the sensor A by utilizing the table as shown in FIG. 9, and determines whether the sheet is put into the precise position or not based on the detect signal output from the sensor B (step S2 as shown in FIG. 5). The size determining part 406 determines the size of the sheet based on the detect signal of the sensor C (step S3 as shown in FIG. 5), and then the feeding process starting part executes a feeding process.

Figure 13:
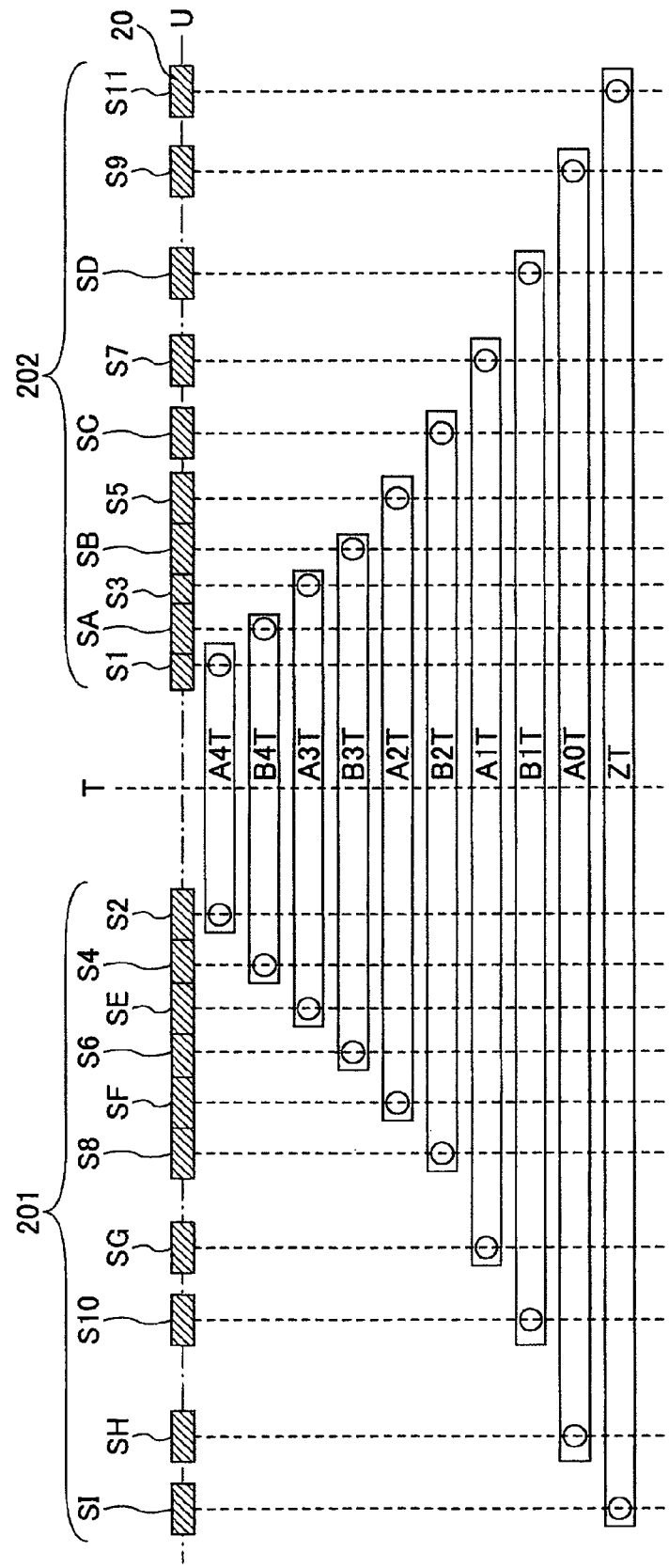
FIG. 13 shows positional relationships between the fore ends of various sizes of the sheets and the size sensors.

Herein, another embodiment of size sensors as shown in FIG. 13 will be described.

FIG. 13 shows positional relationships between the fore ends of various sizes of the sheets and the size sensors. As shown in FIG. 13, size sensors SA to SI are added to the sensors S1 to S11. In this embodiment, a pair of the size sensors is disposed for detecting both edges of each size of the sheet in order to detect setting condition of the sheet (in the precise position or not) and the size of the sheet. The size sensors S1, SA, S3, SB, S5, SC, S7, SD, S9 and S11 are disposed in this order on right side of the midpoint T. The size sensors S2, S4, SE, S6, SF, S8, SG, S10, SH and SI are disposed in this order on left side of the midpoint T.

Relationship between various sizes of the sheets and the pair of the size sensors are as described below. Distances between each of the size sensors and the midpoint T are provided in parentheses.

A4 size; S1 (105 mm), S2 (105 mm)
A3 size; S3 (137 mm), SE (148 mm)
A2 size; S5 (195 mm), SF (210 mm)
A1 size; S7 (282 mm), SG (297 mm)
A0 size; S9 (400 mm), SH (420 mm)
Z size; S11 (451 mm), SI (457 mm)
B4 size; S4 (115 mm), SA (128 mm)
B3 size; S6 (163 mm), SB (182 mm)
B2 size; S8 (235 mm), SC (257 mm)
B1 size; S10 (335 mm), SD (364 mm)

In this embodiment, the size determining part 406 determines the size of the sheet when either one of the pair of the size sensors detects the left side edge or the right side edge of the sheet. Thus, the sheet position detecting part 404 may detect the setting condition of the sheet after the size of the sheet is being detected by the size determining part 406.

Figure 14:
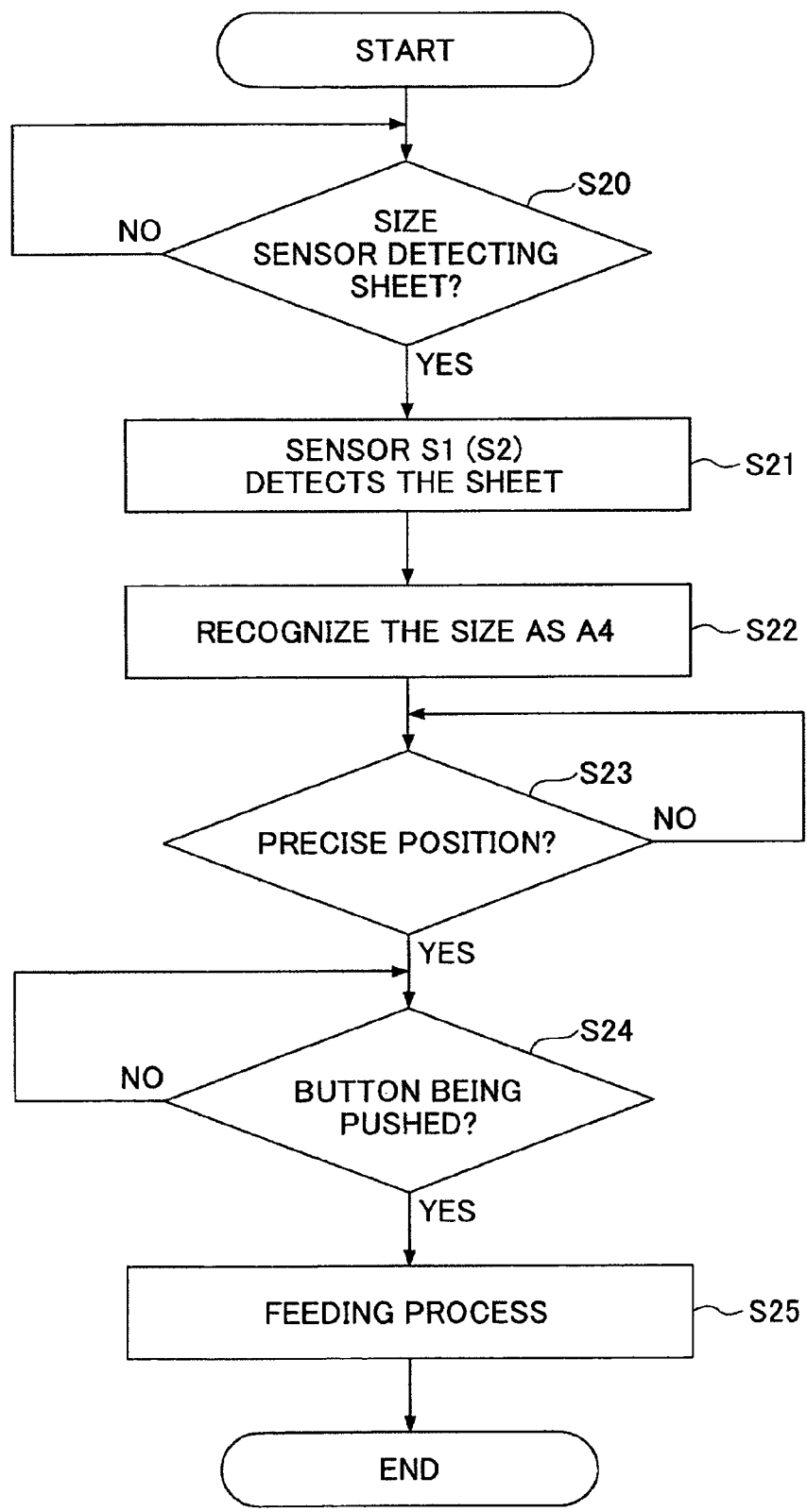
FIG. 14 shows a flowchart in a case where the size sensor S1 or S2 detects the sheet.

FIG. 14 shows a flowchart in a case where the size sensor S1 or S2 detects the sheet.

The size determining part 406 determines whether the size sensor S1 or S2 detects the sheet or not (step S20). When either one of the sensors S1 and S2 detects the sheet (S20 YES), the size determining part 406 determines that the size sensor S1 or S2 detects the sheet (step S21). Then the size determining part 406 determines that the size of the sheet is A4 based on the detect signal of the size sensor S1 or S2 (step S22). Then the sheet position detecting part 404 determines whether both of the size sensors S1 and S2 detect the sheet or not, in order to determine whether the sheet is set into the precise position or not (step S23). When both of the sensors S1 and S2 detect the sheet (S23 YES), the feed button detecting part 408 determines whether the feed button is being pushed or not (step S24). When the feed button is being pushed (S25 YES), the feeding process starting part 410 executes the feeding process (step S25).

As described above, the controller 40 detects that the sheet is set into the precise position when the controller 40 receives the detect signal from the size sensor S2 or S1 after receiving the detect signal from the size sensor S1 or S2. Then the controller 40 begins to execute the feeding process.

As described above, the sheet feeding part 2 of the present embodiment determines whether the sheet is set into the precise position or not based on two detect signals output from two size sensors 20, i.e. the sensor A and sensor B as shown in FIG. 8 or the pair of the size sensors as shown in FIG. 13. When the sheet is set into the guide unit 11, the sheet feeding apparatus of the present embodiment provides the user with massages as described below.

Figure 15A:
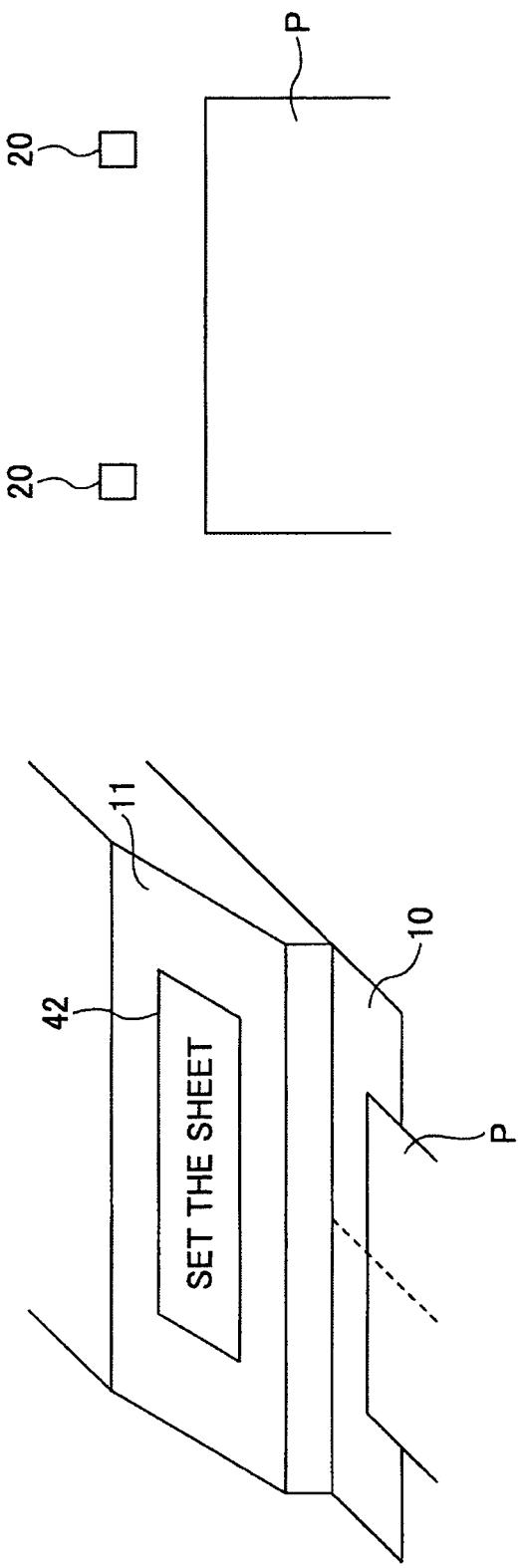
FIGS. 15A to 15C are schematic drawings showing massages displayed in a operational part 42.
Figure 15B:
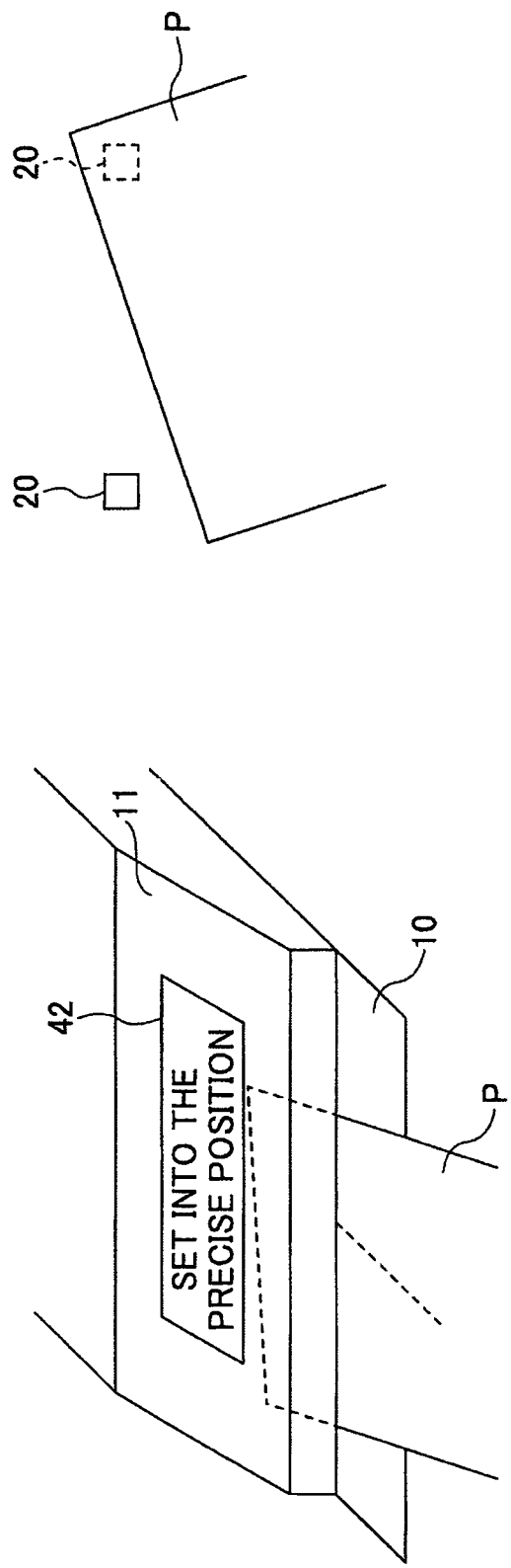
Figure 15C:
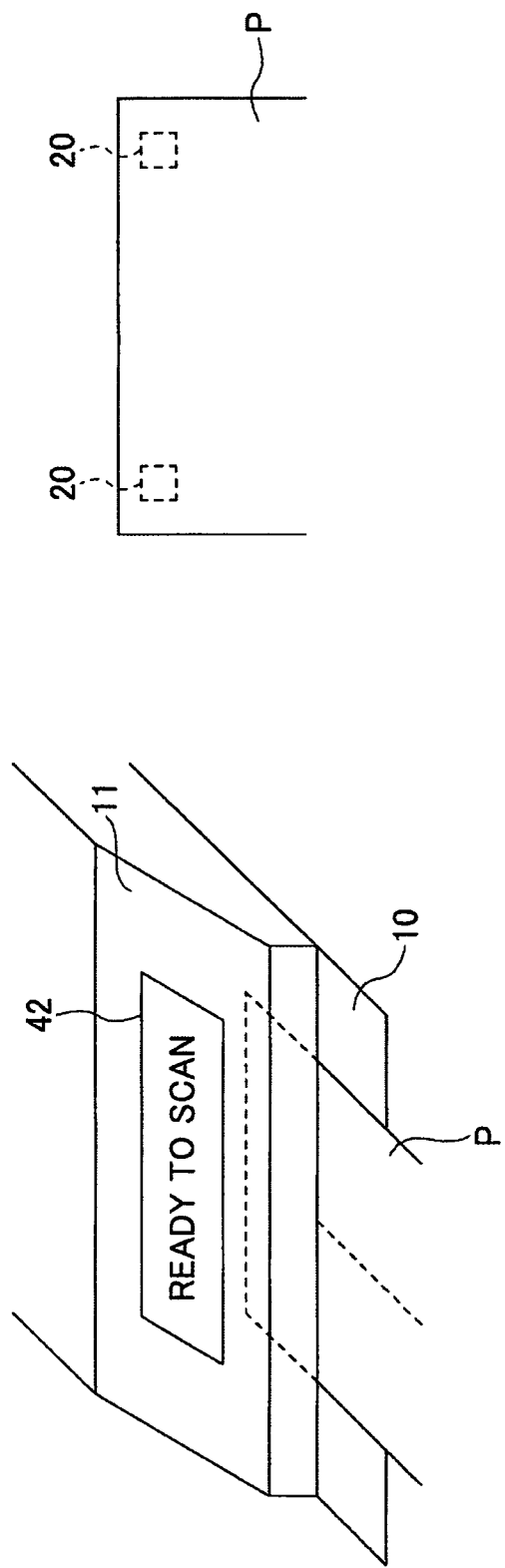

FIGS. 15A to 15C are schematic drawings showing massages displayed in the operational part 42. In this embodiment, the operational part 42 is attached to the guide unit 11.

As shown in FIG. 15A, a massage "set the sheet" is displayed on the operational part 42 when the sheet P is not inserted into the guide unit 11.

As shown in FIG. 15B, a massage "set into the precise position" is displayed on the operational part 42 when the sheet is inserted into the guide unit and either one of the two size sensors detects the edge of the sheet P.

As shown in FIG. 15C, a massage "ready to scan" is displayed on the operational part 42 when both of the two size sensors detect both edges of the sheet P. In this condition, it becomes possible to start feeding process by pushing the feed button.

As described above, the image forming apparatus 1 of the present embodiment includes the operational part 42. The operational part 42 constitutes the alarm part and alarms that the sheet is not set into the precise position. The controller 40 causes the operational part 42 to display the massage "set into the precise position" when the controller 40 receives one of the detect signal from either one of the two size sensors. The controller 40 causes the operational part 42 to display the massage "ready to scan" when the controller receives the two detect signals from the two size sensors.

As described above, the image forming apparatus 1 detects that the sheet is set into the precise position based on the two detect signals output from the two size sensors which detect both edges of the sheet. It becomes possible to wait for, the preparation time until the user sets the sheet into the precise position and to start the feeding process immediately after the sheet is being set into the precise position by the user.

Thus it becomes possible for the user to set the sheet into the precise position even if the user is not accustomed to handle the sheet, and it becomes possible to improve working efficiency of the user.

Herein, the image forming apparatus of the present invention can be applied to a facsimile machine, a copier, and a complex machine of a printing machine, a facsimile machine, and a copier etc.

Further, the present invention is not limited to the embodiment, but variations and modifications may be made without departing from the scope of the present invention.

The present application is based on Japanese Priority Application No. 2009-210639 filed on Sep. 11, 2009 and Japanese Priority Application No. 2010-167785 filed on Jul. 27, 2010 with the Japanese Patent Office, the entire contents of which are hereby incorporated by reference.

What is claimed is:

1. A sheet feeding apparatus comprising:
a plurality of size sensors arranged in a same direction and configured to detect a sheet set at a first position;
a feeder configured to feed the sheet set at the first position to a scan position; and
a controller configured to control the feeder to feed the sheet based on two detect signals output from two size sensors, respectively, among the plurality of the size sensors, the plurality of size sensors configured to detect a plurality of different sheet widths and the two size sensors configured to detect one width corresponding to the sheet of the plurality of different sheet widths.

2. A sheet feeding apparatus as claimed in claim 1, wherein the feeder includes a feeding roller configured to set the sheet into the first position by being confronted by a fore end of the sheet, and wherein the same direction in which the plurality of size sensors are arranged substantially corresponds to a rotational axis of the feeding roller.

3. A sheet feeding apparatus as claimed in claim 1, wherein the controller determines that the sheet is set at the first position based on the two detect signals output from the two size sensors before controlling the feeder to feed the sheet,
wherein a first size sensor of the two size sensors is located outermost from a reference point among the size sensors detecting the sheet, and
wherein a second size sensor of the two size sensors is located on an opposite side of the first size sensor with respect to the reference point and is located second outermost from the reference point among the size sensors detecting the sheet.

4. A sheet feeding apparatus as claimed in claim 3, wherein the controller determines a size of the sheet based on a detect signal output from a third size sensor among the plurality of size sensors before controlling the feeding part to feed the sheet, and wherein the third size sensor is located on the same side as the second size sensor with respect to the reference point and is located adjacent the second size sensor.

5. A sheet feeding apparatus as claimed in claim 3, wherein the first size sensor is spaced from the midpoint by a first distance, and
the second size sensor is spaced from the midpoint by a second distance different from the first distance.

6. A sheet feeding apparatus as claimed in claim 1, wherein a third size sensor arranged adjacent the first size sensor,
a fourth size sensor arranged adjacent the second size sensor,
the first and third size sensors arranged on a first side of the reference point and the second and fourth size sensors arranged on a second side of the reference point opposing the first side, and
the third and fourth size sensors detecting an absence of edges of the sheet.

7. A sheet feeding apparatus as claimed in claim 1, further comprising: an alarm configured to provide a warning when the sheet is not set at the first position, wherein the controller controls the alarm to provide the warning based on the two detect signals output from the two size sensors among the plurality of the size sensors.

8. An image forming apparatus comprising:
a sheet feeding apparatus claimed in claim 1;
a scanner configured to scan the sheet fed by the sheet feeding apparatus; and
an image former configured to form an image based on scanned data output from the scanner.

9. A sheet feeding apparatus as claimed in claim 1, wherein a first number of size sensors are arranged on a first side of a reference point, and
a second number of size sensors are arranged on a second side of the reference point opposing the first side, the first number is different from the second number.

10. A sheet feeding apparatus as claimed in claim 1, wherein the plurality of size sensors are arranged along substantially a same line.

11. A sheet feeding apparatus as claimed in claim 1, wherein the plurality of size sensors are arranged relative to a midpoint of the sheet.

12. A sheet feeding apparatus as claimed in claim 1, wherein
a first size sensor of the two size sensors spaced a first distance from a reference point, and
a second size sensor of the two size sensors spaced a second distance from the reference point different from the first distance, the first and second size sensors arranged on opposing sides of the reference point.

13. A sheet feeding apparatus, comprising:
a plurality of size sensors arranged in a same direction and configured to detect a sheet set at a first position;
a feeder configured to feed the sheet at the first position to a scan position; and
a controller configured to control the feeder to feed the sheet based on two detect signals output from two size sensors, respectively, among the plurality of the size sensors, wherein the controller determines a size of the sheet based on the detect signal output from at least one of the two size sensors before controlling the feeding part to feed the sheet, and wherein the plurality of the size sensors are arranged in pairs, each pair of the size sensors configured to detect respective edges corresponding to a different size of the sheet.

14. A sheet feeding apparatus as claimed in claim 13, wherein the controller determines that the sheet is set into the first position based on the two detect signals output from the pair of the two size sensors before controlling the feeder to feed the sheet.

15. A sheet feeding apparatus as claimed in claim 14, further comprising:
an alarm configured to provide a warning when the sheet is not set at the first position, wherein the controller is configured to control the alarm to provide the warning based on the two detect signals output from the two size sensors among the plurality of size sensors.

16. A sheet feeding apparatus as claimed in claim 13, wherein each pair of the size sensors is configured to detect different widths of the sheet.

17. A sheet feeding apparatus as claimed in claim 16, wherein the size sensors in each pair are spaced at different distances from the midpoint.

18. A sheet feeding method, comprising:
detecting a sheet set at a first position based on detect signals output from a plurality of size sensors;
feeding the sheet set at the first position to a scan position; and
controlling a feeder to feed the sheet based on two detect signals output from two size sensors among the plurality of the size sensors, the plurality of size sensors configured to detect a plurality of different sheet widths and the two size sensors configured to detect one width corresponding to the sheet of the plurality of different sheet widths.

* * * * *